J. S. KAUFMAN.
CAMERA EXPOSURE DEVICE.
APPLICATION FILED NOV. 7, 1914.
1,164,526.
Patented Dec. 14, 1915.
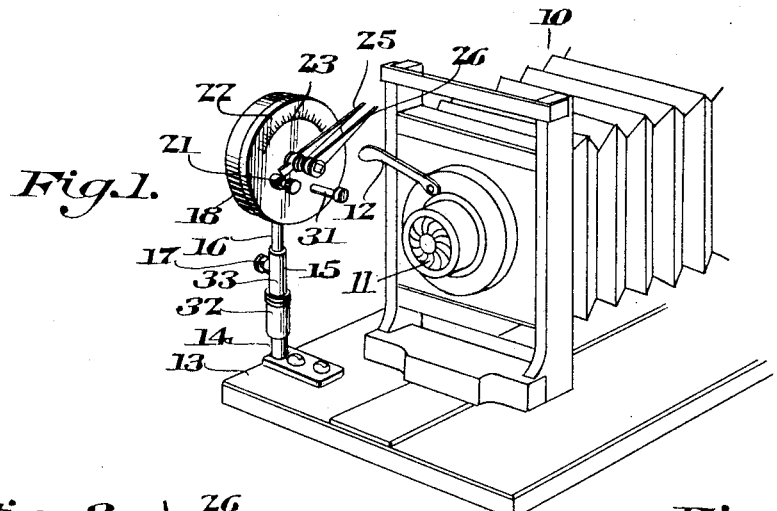
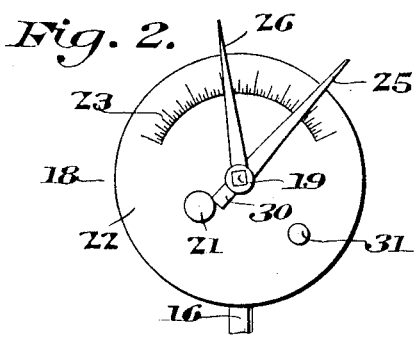
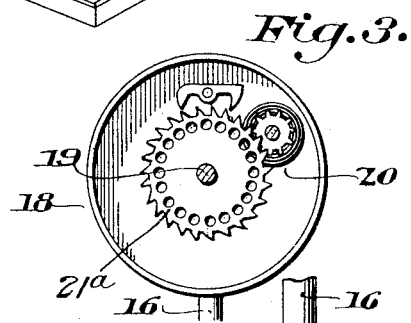
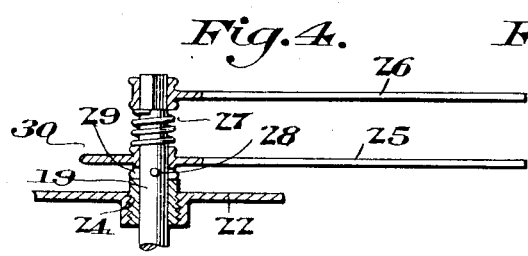
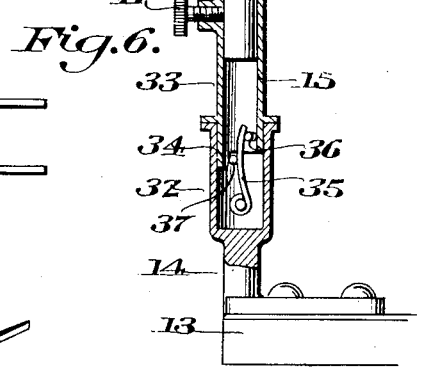
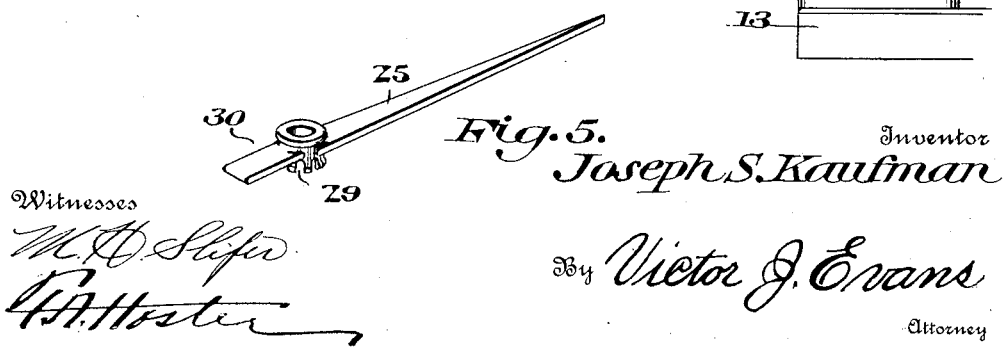
Inventor
Joseph S. Kaufman
Witnesses
By Victor J. Evans
Attorney

UNITED STATES PATENT OFFICE.

JOSEPH S. KAUFMAN, OF BALTIMORE, MARYLAND.

CAMERA EXPOSURE DEVICE.

1,164,526.  Specification of Letters Patent. Patented Dec. 14, 1915.

Application filed November 7, 1914. Serial No. 870,893.

*To all whom it may concern:*

Be it known that I, JOSEPH S. KAUFMAN, a citizen of the United States, residing at Baltimore, in the State of Maryland, have invented new and useful Improvements in Camera Exposure Devices, of which the following is a specification.

The invention relates to photography, and more particularly to cameras, and has for an object to provide a device for use in connection with cameras whereby the exposure incident to the operation of the shutter can be timed and controlled so that the operator can readily fix a time prior to the operation of the shutter and which time will be sufficient to permit the operator to place himself in the picture or view to be taken by the camera.

The invention contemplates, among other features, the provision of a compact device which can be readily applied to and as easily removed from a camera and which operates upon the usual trigger of the shutter to the end that the operator can so adjust the device that a certain predetermined time will elapse between the commencement of operation of the device and the operation of the shutter thereby, and which predetermined time will be sufficient to permit the operator to arrange himself in the view which is to be taken, whether the operation of the shutter results in what is commonly known as a snap shot or time exposure.

In the further disclosure of the invention reference is to be had to the accompanying drawings, constituting a part of this specification, in which similar characters of reference denote corresponding parts in all the views, and in which:

Figure 1 is a fragmentary perspective view of a camera showing the device applied thereto, the trigger operating members being shown in position to operate the trigger for a snap shot; Fig. 2 is a fragmentary view of the device in elevation, showing the trigger operating members in position for taking a time exposure; Fig. 3 is a view looking at the front of the device, with the face removed; Fig. 4 is a fragmentary enlarged vertical sectional view taken through the trigger operating members, showing the manner of mounting the same; Fig. 5 is a perspective view of one of the trigger operating members; and Fig. 6 is a fragmentary vertical sectional view taken through the supporting member, showing the sleeve sections thereof.

Referring more particularly to the views, I disclose a camera 10 of the usual construction, having the usual shutter 11 operated by a trigger 12 for the purpose of exposing the usual plate or film in the camera to the action of light and which exposure may be either an instantaneous or time exposure, the former being usually known as a snap shot. The camera includes the usual platform 13 and arranged upon the platform is a suitable supporting member 14 consisting, more particularly, of a sleeve 15 and a rod 16 slidable in the sleeve, with a set screw passing through the sleeve to engage the rod 16 and secure the same in an adjusted position upon the sleeve.

The rod 16 supports a casing 18 and journaled to rotate in the casing is a shaft 19 operated upon by a spring clock mechanism 20 in the casing and which is suitably controlled by a stop 21, which is in the form of a pin adapted to engage in any one of a series of concentrically disposed holes 21$^a$ formed in the escapement gear of a clock mechanism, said stop projecting exteriorly of the casing as shown, so that when the stop is pulled upwardly the clock mechanism 20 will be set in motion and when pushed downwardly will result in a stoppage of the operation of the clock mechanism, the said clock mechanism being wound up by rotating the shaft 19 in a direction opposite to its usual direction of rotation.

The casing 18 includes a face or cover 22 on which is formed or to which is secured an indicator 23 consisting of a series of graduations denoting seconds of time. The shaft 19 is suitably journaled in a collar 24 having threaded connection with the cover 22 of the casing and the outer end of the shaft projecting beyond the cover has loosely arranged to turn thereon a trigger operating member 25, with a second trigger operating member 26 rigidly keyed or otherwise secured to the shaft and preferably in superposed relation to the trigger operating member 25. An expansible helical spring 27 encircling the shaft 19 is interposed between the inner ends of the trigger operating members and bearing against the loosely mounted trigger operating member 25 causes the trigger operating member 25 to be pressed downwardly so that a locking pin 28 will extend into one of a series of slots 29 formed in the inner end of the trigger operating member 25, thus holding the trigger operating member against rotation upon the shaft. The trigger operating member 25 preferably has a handle 30 and it will be clearly seen that if desired the handle 30 can be grasped and the trigger operating member 25 slid outwardly upon the shaft until the pin 28 is removed from one of the slots 29, and thus permitting of rotating the trigger operating member 25 loosely upon the shaft until it is set in the desired position with respect to the indicator 23. The release of the handle 30 causes the spring 27 to act and move the trigger operating member 25 downwardly so that the pin 28 will again extend into one of the slots 29 and lock the trigger operating member 25 against rotation upon the shaft.

Referring to Fig. 1, it will be clearly seen that in the use of the device the casing is arranged upon the adjustable support so that the trigger operating members will lie in the path of the trigger 12 of the shutter 11 and by simply grasping the trigger operating members and turning them counterclockwise, it will be clearly apparent that rotation being imparted to the shaft in a counterclockwise direction, the clock mechanism within the casing will be wound up and held in wound up position by the stop member 21. Now if it is desired to take a snap shot, the trigger operating member 25 is arranged to lie immediately beneath the trigger operating member 26 so that they will appear as one member and then by pulling outwardly upon the stop member 21 to release the clock mechanism and cause the same to operate, rotation will be imparted to the shaft in a clockwise direction, thus rotating the trigger operating members and bringing them into engagement with the trigger of the shutter to result in the operation thereof, thereby actuating the shutter to expose the plate or film for an instant, or what is known as a snap shot. Now it may happen that the operator desires to place himself in the view or picture which is to be taken and with this idea in mind he rotates the trigger operating members in a counterclockwise direction, thereby winding up the mechanism until the trigger operating members reach a degree or graduation upon the indicator which will allow sufficient time between the beginning of the actual operation of the clock mechanism and the time when the trigger operating members engage the trigger of the shutter to enable the operator to place himself in the view. When this has been done he actuates the stop 21 to release the clock mechanism and cause it to operate and then quickly places himself in position in front of the camera so that when subsequently the trigger operating members operate upon the trigger of the shutter and the exposure takes place the operator will form a part of the resulting picture to be produced. In order to limit the further rotation of the trigger operating members after they have operated upon the trigger, a supplementary stop pin 31 is arranged upon the cover to be engaged by the trigger operating members and limit their further rotation, as will be clearly understood, until the operator, returning to the camera, can actuate the stop 21 and stop the operation of the clock mechanism. Now if the operator desires to take a time exposure and still have sufficient time to place himself in the picture, or if he desires to take a time exposure and wishes to know precisely the length of time the shutter is to remain open, he grasps the handle 30 of the trigger operating member 25 and moves the trigger operating member 25 upwardly upon the shaft so as to remove the same from engagement with the pin 28, thus permitting of rotating the trigger operating member 25 upon the shaft with relation to the indicator until the desired space between the trigger operating member 26 and the trigger operating member 25 is secured, this space upon the indicator being indicative of the number of seconds the exposure is to be made, whereas the trigger operating member which is nearest to the trigger of the shutter, can also be spaced a desired distance upon the scale or indicator from the trigger of the shutter so as to give the operator sufficient time to place himself in the view before the trigger of the shutter is initially operated for the time exposure. After the trigger operating member 25 has been arranged in the desired relation to the indicator and to the trigger operating member 26, it is released and the spring 27, acting upon the trigger operating member 25, will cause the same to lock with the pin 28 upon the shaft 19. The operator now actuates the stop 21 to set the clock mechanism in motion and then hurriedly places himself in the view. The first trigger operating member now comes into engagement with the trigger of the shutter and operates the same to open the shutter and as the clock mechanism continues to rotate the next trigger operating member will come into engagement with the trigger of the shutter and again operate the same after the predetermined interval of time has elapsed, thus closing the shutter and completing the time exposure.

The sleeve 15 in which is adjustably arranged the rod 16 normally held by the set screw 17 is preferably formed in two sections 32 and 33, of which the lower section 32 is secured or clamped to the platform 13 of the camera in any convenient manner and has the upper section 33 arranged to rotate therein, said upper section 33 being provided with a depending projection 34 and said lower section carrying a spring 35 bearing against a pin 36 in the upper section 33, with a stop pin 37 projecting from the inner wall of the lower section and adapted to be engaged by the projection 34 to limit the rotation of the upper sleeve upon the lower sleeve in one direction, said rotation being due to the action of the spring 35 bearing against the pin 36 in the upper section. With this construction it will be seen that after the trigger operating members 25 and 26 have been actuated to operate the trigger of the shutter, the casing, together with its supporting rod and the upper section of the sleeve, can be partially rotated upon the lower section of the sleeve and against the action of the spring 35 in order that in moving the trigger operating members counterclockwise to return them to an initial position said trigger operating members can pass the trigger of the shutter without disturbing the same, the casing, upon being released, being adapted to rotate back to its initial position and which will depend upon the engagement of the projection 34 with the pin 37 in the lower section of the sleeve. With this construction the trigger operating members will lie in the path of the trigger of the shutter when the clock mechanism is actuated to operate the trigger operating members, and the entire casing can then be swung so as to move the trigger operating members out of the path of the shutter when they are turned counterclockwise to be returned to initial position.

From the foregoing description it will be clearly seen that the device described consists of few and simple parts, can be effectively operated for time or instantaneous exposures and furthermore performs a double function of permitting the operator to place himself in the view if he so desires before the exposure is made or it permits the operator to clearly and accurately ascertain and set the trigger operating members so that the desired time exposure will be subsequently made by the engagement of the trigger operating members with the trigger of the shutter when the clock mechanism is set in motion.

It will be understood that various slight changes may be made in the structure set forth without departing from the spirit of the invention, and it will be further understood that I do not limit myself to the particular disclosure of the invention, the scope of the invention being defined by the appended claim.

Having thus described my invention, I claim:

A camera attachment for the trigger of the shutter of a camera comprising a casing adjustably supported upon the camera, a plurality of trigger operating members mounted to turn upon the casing and normally lying in the path of the trigger of the shutter to actuate the same, means for operating said trigger operating members, and means for permitting of moving said casing to move said trigger operating members out of the path of the trigger of the shutter.

In testimony whereof I affix my signature in presence of two witnesses.

JOSEPH S. KAUFMAN.

Witnesses:
WALTER E. SMITH,
EMANUEL DOUGHERTY.